United States Patent [19]

Gibbs

[11] Patent Number: 4,886,593

[45] Date of Patent: Dec. 12, 1989

[54] DEVICE FOR DESTROYING BACTERIA

[76] Inventor: Robert W. Gibbs, 6 Verbena Avenue, Toronto, Ontario, Canada, M1S 1K1

[21] Appl. No.: 314,980

[22] Filed: Feb. 24, 1989

Related U.S. Application Data

[63] Continuation of Ser. No. 92,568, Sep. 3, 1987, abandoned.

[30] Foreign Application Priority Data

Sep. 11, 1986 [GB] United Kingdom ............... 8621948

[51] Int. Cl.4 ............................................. A61L 2/00
[52] U.S. Cl. .................................... 204/302; 204/286; 204/290 R; 422/22
[58] Field of Search ........... 204/280, 286, 288, 290 R, 204/302, 304, 305, 306, 307, 308; 210/243, 748; 422/22

[56] References Cited

U.S. PATENT DOCUMENTS

| | | | |
|---|---|---|---|
| 1,934,703 | 11/1933 | Golden | 99/451 |
| 1,987,665 | 1/1935 | Brunner | 99/451 |
| 2,428,328 | 9/1947 | Ham et al. | 204/180 |
| 4,545,887 | 10/1985 | Arnesen et al. | 204/280 |
| 4,822,473 | 4/1984 | Arnesen | 204/302 |

FOREIGN PATENT DOCUMENTS 2016029 1/1971 Fed. Rep. of Germany ........ 422/22

Primary Examiner—John F. Niebling
Assistant Examiner—William T. Leader
Attorney, Agent, or Firm—Zarley McKee, Thomte, Voorhees & Sease

[57] ABSTRACT

A method of killing bacteria or inhibiting growth of bacteria especially in a potable water supply or a hot water supply for personal washing purposes, comprising subjecting the water to an electrostatic effect of sufficient intensity to kill or inhibit the growth of bacteria, and a device for carrying out the method; said device being preferably located in the elbow of a water pipe so as to extend along an adjacent pipe length and comprises a cylindrical collar 1 mounted on the exterior of ducting means (13 or 12') and preferably at an elbow region (11 or 11') with said collar 1 having a passage therethrough and leading to a passage in the ducting means, an elongate tubular housing 3, preferably of polypropylene, closed at one end 4 and having at its other end, a flange 3' abuttable against the shoulder 2 or collar 1 via the intermediary of sealing means 5, and a close fitting electrode 7, preferably of solid copper or brass, insertable into said housing 7 via the opening of the collar 1 and having terminal means 7' for connection to a high voltage source which is also connectable to the ducting means to provide an electrostatic field in the water and preferably a flow of a few milliamps.

14 Claims, 3 Drawing Sheets

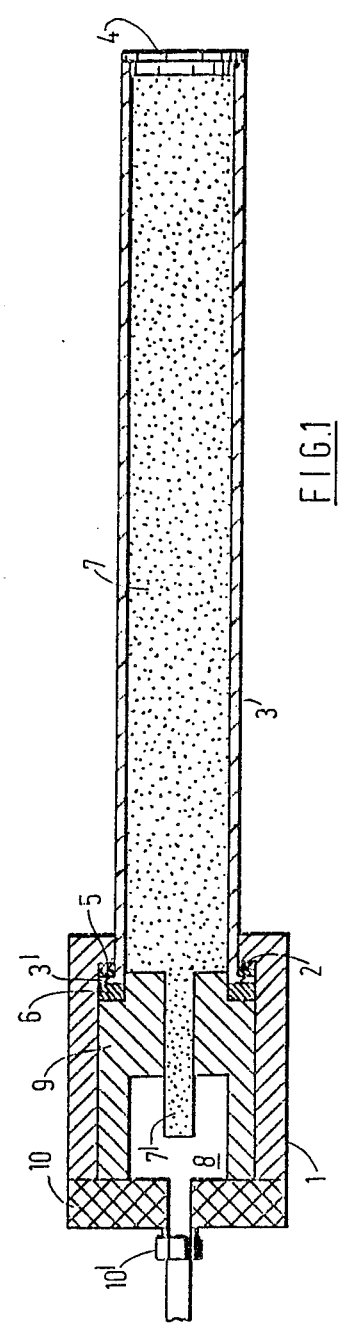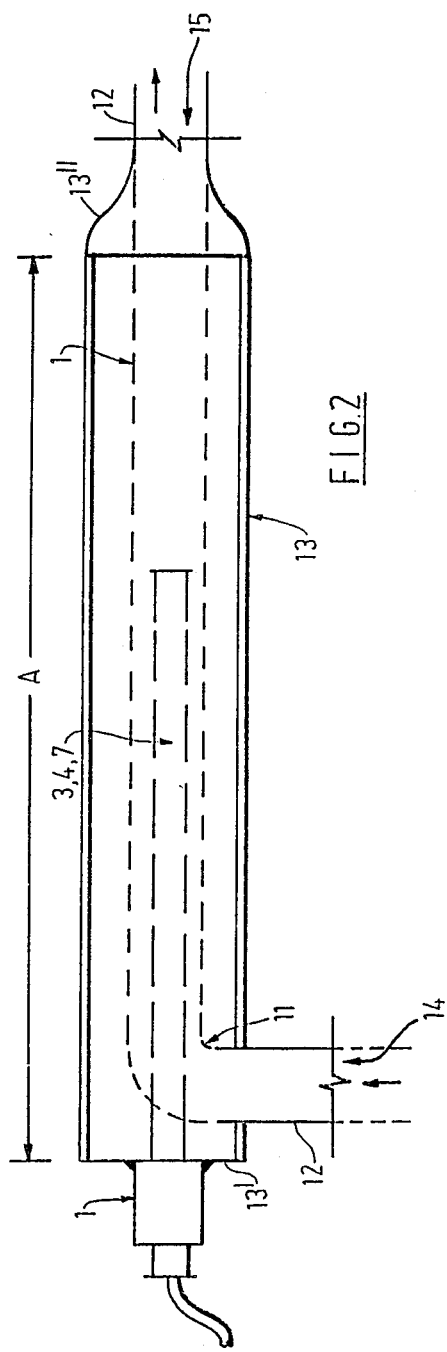
FIG.1
FIG.2

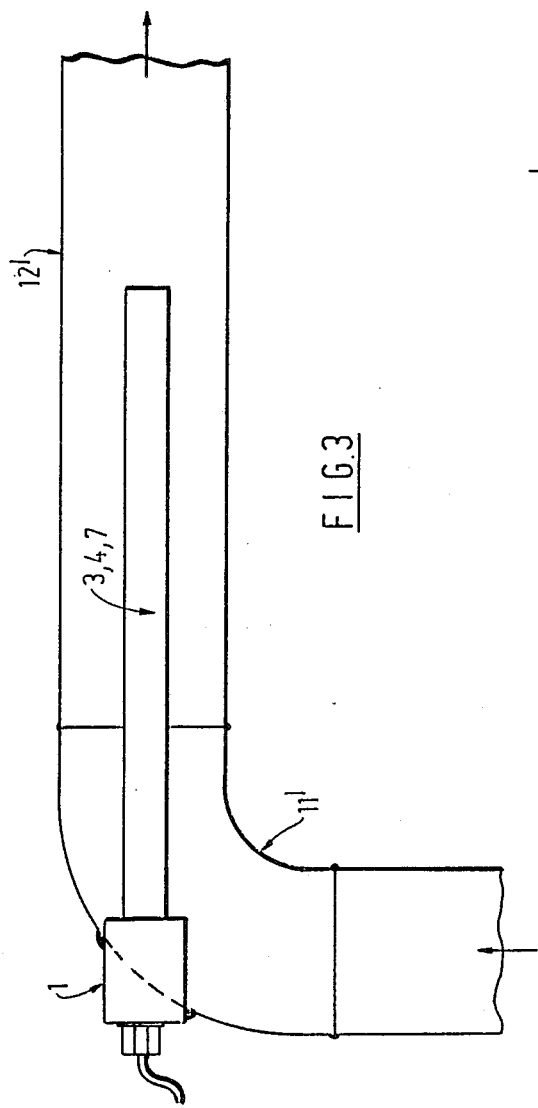
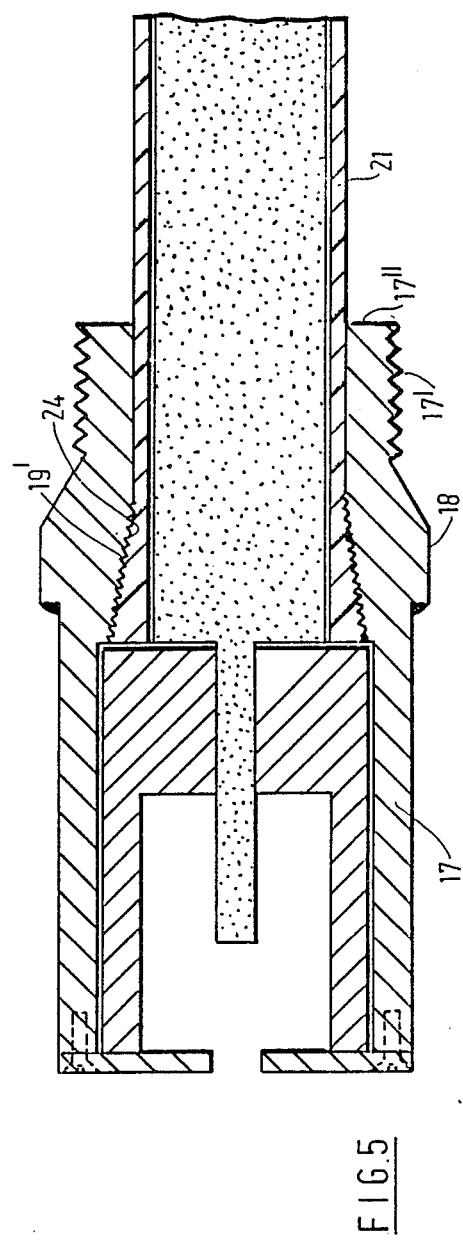

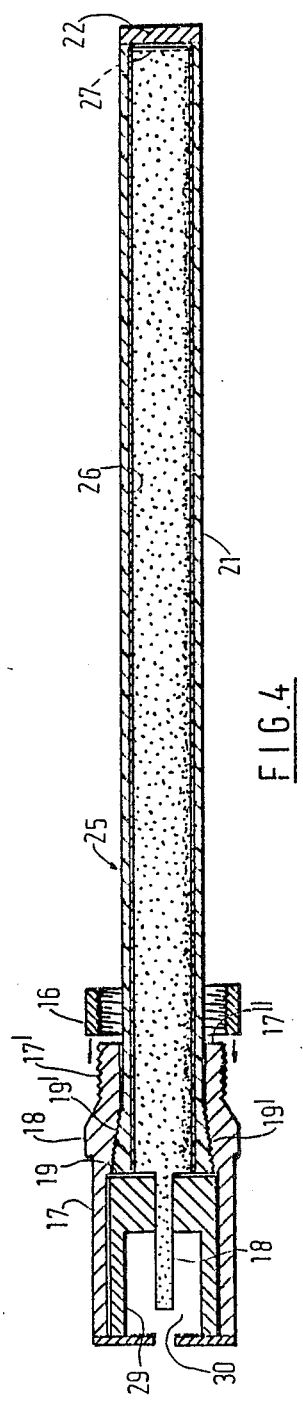
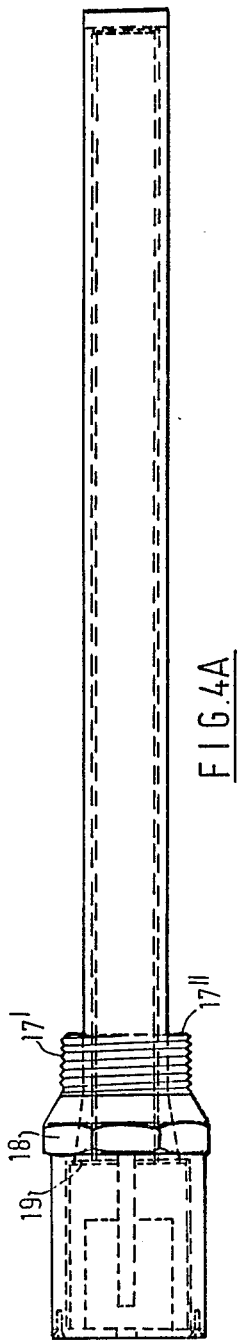
FIG.4
FIG.4A

DEVICE FOR DESTROYING BACTERIA

This is a continuation of copending application Ser. No. 092,568, filed on Sept. 3, 1987.

The present invention relates to a method for removal, reduction or the inhibition of growth of bacteria or other live contaminants or microorganisms in water systems and a device for effecting such. For simplicity, reference will be made herein to bacteria but the invention is applicable to other microorganisms.

In the destruction or reduction of bacteria in water systems, chemical treatments have been utilised which are costly, involve time consuming labour and are not always fully effective. In the removal or reduction of bacteria, filtration has also proved of value and may be used alone or in combination with chemical treatment.

There are many known electrostatic devices for de-scaling purposes wherein an electrode is well insulated and placed inside its own housing. The electrode is charged to a very high D.C. potential with the housing being grounded—thus creating an electrostatic field between electrode and housing. The housing normally has an inlet and an outlet and water to be treated is directed into the thus formed vessel for treatment. This is a standard de-scaling arrangement and is disclosed, for example, in many prior patents, e.g. U.S. Pat. Nos. 3,585,122; 4,024,047; 4,073,712; 4,199,429; and 4,545,889. All these prior specifications are concerned with electrostatic de-scaling and corrosion control in many varied water systems, i.e. in potable hot water, in steam heating, in condenser water, in chilled water or in hot water heating. The invention would generally speaking have no practical use in steam, hot water heating or chilled water because bacteria is generally not a problem in these particular systems. U.K. Specifications 1554893 and 713,161 disclose killing or inhibiting the growth of bacteria in water by means of a magnetic or electromagnetic field but disadvantages arise and the effectiveness is not satisfactory.

The present invention is based on the discovery that the application of an electrostatic field to water of a sufficient intensity is such as to kill or inhibit the growth of bacteria or other microrganisms.

According to the present invention a method of killing or inhibiting the growth of bacteria or other microorganisms in flowing water or other liquid comprises subjecting the water to and electrostatic effect of intensity sufficient to kill or inhibit the growth of bacteria or microorganisms as required.

Also according to the present invention a device for electrostatically killing or inhibiting the growth of bacteria in water or other liquid comprises a collar or other mounting means mounted on the exterior of a means for containing water, such as a pipe, and said mounting means and containing means having passage means communicating with the interior of said means for containing water, an elongate tubular housing of electrically insulating material close at one end having means for a securement, such as a screw-thread, flange means or the like, in the aperture in said collar so as, in use, to extend into said means for containing water; and an electrode insertable into said elongate tubular housing via said opening in the collar or other mounting means and having terminal means for connection to a high voltage source which is also connectable to the means for containing water or other means so as to provide an electrostatic field in the water. Alternatively or additionally, the electrode is connectable to an AC voltage of, for example, 5000 volts so as to create an electromagnetic field.

Preferably the tubular housing is cylindrical and has walls made of solid polypropylene or other electrically insulating material which is sufficiently thick to be protective to and insulative of an electrode to be located therein. As will be described subsequently with reference to a preferred embodiment it may be desirable to construct the device and supply a DC voltage of sufficient intensity as to have a small current leakage of a few milliamps.

In a preferred embodiment of the invention, the device is placed directly into the piping of a new or existing system and is preferably located in the elbow of a water pipe.

Whilst electrostatic electrodes are known for de-scaling purposes and operate at 5,000–60,000 V, such have not hitherto been provided for killing or inhibiting growth of bacteria.

Standard power packs and protection and cut-out devices can be utilised.

Also disclosed is a method of construction that is modular, with all parts being assembled on site, after the installation of the mounting means in the form of a holding sleeve. The device may be dissassembled to permit repair or replacement of parts and, importantly where appropriate, it enables welding to be effected during installation without damaging other parts of the device.

In respect of installation, most prior de-scaling equipment has been installed by means of a three valved by-pass, wherein closing the valve on the system-line forces water to go through the equipment and then back into the system on the other side of the valve. Another known means of installation of de-scaling devices involves utilising an existing blanked-off connection in a tank or vessel, and on removing the plug (if it happens to be large enough to accommodate the equipment) the electrode is then offered into the said tank or vessel. However, the chances of utilising such a connection are slim indeed considering that most vessels are designed for their particular installation and all tappings provided are for a specific purpose of original control equipment. Therefore, if a connection is required, the tank or vessel would have to be drained and a connection welded in. Whilst this operation sounds quite simple, in practice it is not. Firstly, all tanks and vessels are considered "pressure tested" and to weld into these, certain criteria has to be followed, sometimes even as far as stress-relieving and x-ray testing, which would certainly take away from the contention of simple and inexpensive installation. Also in this connection, many potable water tanks are galvanized or lined with some substance, again resulting in considerably more costs than might be initially envisaged.

The invention, however, may overcome or minimize these installation problems by its versatility and by being able to match any piping, be it ferrous or non-ferrous.

According to much prior published documentation, the larger the dispersion, the weaker the field. This is not desirable for the present invention. The present invention needs the strongest possible field to react against existing bacteria contained in the water. To this end, locating the electrode in the piping rather than in any tank or vessel will greatly improve its performance.

Placing the electrode in a pipe and passing all the water from any particular system constantly through this pipe, will ensure complete treatment of the entire water contained in said system. With this information disclosed, it is apparent that the method and device of the invention should preferably be utilised only in systems that are constantly moving and also be used in a pipe where all the system's water may constantly pass. The device of the invention when placed in a quiescent area of any system will only treat the water in its immediate vicinity, therefore correct placement is of major significance.

Since very high voltages are being utilized with the present invention and since the device is completely immersed in water, (which itself is a very good conductor), the means of insulation between the high voltage and the water, (or ground connection) is of importance. In the device of the present invention, insulation is preferably achieved by a polypropylene sleeve which will be described in detail later. The choice of polypropylene as the material for the sleeve was made because of its zero water absorption, for the fact that it will withstand very high water temperature, and that it will not scratch, as is a problem with many other insulators on other products. If for any reason the sleeve should fail, a ground fault detector is installed which will trip at a several milli-amp current draw or at least above a considered permissible few milliamp leakage.

Water impingement has been a recurring problem in the field of de-scaling devices and the cause of many failures. The present invention minimizes any such occurrences by having only one water seal, compared with as many as six on some prior de-scaling equipment. Even in the event of failure, it is possible, because of the present invention's preferred modular design, to readily replace the insulation sleeve rather than to discard the whole electrode and replace same completely as was necessary with prior de-scaling devices.

The invention will be described further, by way of example, with reference to the accompanying drawings, in which:

FIG. 1 is a section through an embodiment of the device of the invention;

FIG. 2 is a schematic illustration of the installation of a device in the elbow of a water pipe such as where the existing piping is less than four inches diameter; and FIG. 3 is a schematic illustration of the installation of a device in the elbow of a water pipe such as where the existing piping is greater than four inches in diameter.

FIG. 4 is a schematic cross section through an alternative embodiment, and FIG. 4A is an elevation thereof; and FIG. 5 is an enlarged fragmentary detail of one end of the probe.

This invention comprises a probe support or collar 1 which is locatable by means such as welding or threaded means or the like, to means for containing water such as a pipe or housing (not shown). The collar 1 is preferably cylindrical and has a step or shoulder 2. A tubular member 3 of electrically insulating material, such as polypropylene, is inserted in collar 1. The tubular member has a closed end 4 and an open flanged end with the flange 3' thereof locating on the shoulder 2 of the internal recess of the collar 1. Suitable sealing means 5 are provided between the flange 3' and the shoulder 2 of the collar 1, e.g. a fluid sealing gasket. A closure disc or hold-down flange 6 is secured by a screw means (not shown) locatable in threaded recesses (not shown) in the seat or shoulder 2 of the collar 1 with suitable sealing means therearound.

The tubular member 3 is cylindrical and must be of sufficiently thick electrically insulating material so as to be protective and avoid water ingress and/or damage.

Inside the tubular member 3 is a solid copper or brass or other metal bar acting as an electrode 7 and which preferably fits very closely to the inside of the polypropylene tubular member 3 so as to avoid any movement or likely damage or leakage of water thereinto.

The end of the cylinder forming the electrode 7 is milled down to form a terminal 7' and is connectable to a high voltage DC current of the order 5000 volts or upwards to provide an electrostatic field in the water.

An internal electrode insulator 9 is located in collar 1 and the terminal 7' extends into a cavity 8 thereof. A dust and electrical sealing flange 10 is provided and has an electrical connection 10' to a control box (not shown).

The other terminal earth of the source (not shown) is applied to the means for containing the water which will normally be of metal.

Preferably an AC voltage is stepped to approximately 50,000 AC volts producing electromagnetic field effect and it is then rectified to produce 5000 DC electrostatic effect which kills or inhibits the growth of bacteria.

The installation illustrated in FIG. 2 is of a device according to the invention in the elbow 11 of a pipe whose diameter (of, for example, four inches) is insufficient to permit the sleeve or collar 1 to be welded into an aperture cut in the elbow 11. In this arrangement, a section of piping indicated in broken line is removed or omitted and an outer casing or factory piping 13 preferably of 4 inch diameter with an inlet and an outlet to match the existing piping, is welded to the ends of existing piping 12—the ends 13' and 13" of piping 13 being closed. The probe device is welded via collar 1 about an aperture in end plate 13 and the probe 3, 4, 7 extends into factory piping 13. Water flows in at inlet 14 and out at outlet 15. In the example dimension A is a minimum of 30 inches.

The steps to follow in installation are to omit or remove existing elbow 11 and section of existing pipe 12 and to install factory supplied piping 13, if welded or soldered into place—let the connections cool before installing probe device. This is very important so as not to subject the probe device to any extreme heat without the presence of water. When the probe device is installed and water tight, activate power supply similar to as mentioned.

In FIG. 3, where the piping is of sufficient size, such as four inches or over, to have the probe device mounted directly thereon, the collar 1 is welded to an aperture in the elbow 11' so that the probe means 3, 4, 7 extends along the existing pipe work. The installation steps involve cutting an opening in an existing elbow 11 to accommodate the holding sleeve 5. When the holding sleeve 5 is installed, and in the case of welding, the piping is cooled, slide the probe 1 into the sleeve 5. Make water tight and activate power supply.

In FIGS. 4, 4A and 5 an alternative embodiment is schematically illustrated and includes modification and improvements over the device of FIG. 1. The device for electrostatically inhibiting growth of or killing bacteria may be made of smaller size than that of FIG. 1 and comprises a cylindrical mounting collar 16 having a screw thread 16' on its interior and being securable for example, by welding to surround an aperture in the elbow of a pipe (not shown but similarly to FIGS. 2 and 3). A cylindrical housing 17 is screw threaded 17' on its exterior to cooperate with the screw thread in collar 16 and has a hexagonal or the like 18 for engagement by a spanner wrench or the like for securement purposes to enable the housing 17 to be screwed into collar 16 and for end 17" to abut the pipe elbow or similar surface (not shown).

The housing 17 has a shoulder 19 against which an O-ring or like washer 20 may be sealed for sealing purposes and shoulder 19 has a threaded portion 19'.

A tubular member 21 of electrically insulating material such as polypropylene and with a wall thickness of ¼" for example, with similar requirements as for the device of FIG. 1, has an end closed by a solid plug or closure plate 22 of electrically insulating material preferably of the same material and located by welding, bonding or the like or may be formed as a single piece by, for example, injection moulding. The tubular member 21 has an externally threaded portion 24 which cooperates with threaded portion 19'. The member 21 may be milled from a solid bar with an enlargement at one end (and no flange) for the threaded portion. The threads 24 and 19 start part way between end 17' and the end terminal 28 extends from and are tapered divergingly away from said closure end 22, i.e. from the water, so as to prevent flow of water and so that the tubular member 21 needs to be inserted with its closed end 22 leading through the housing 17.

An electrode 25 is provided and mainly comprises a cylindrical, hollow tubular member 26 of copper or brass for example, fitting very closely inside member 21, e.g. with 0.080 inch clearance and is closed by a disc 27 at one end. The other end of tubular member 26 is closed by a further disc 27' having an electrode terminal 28 extending therefrom and through an insulator 29 into a cavity 30. A dust and electrical sealing flange 10 is provided with an electrical connection to a control box. The terminal 28 is connectable to one terminal of a high voltage D.C. current source of similar nature as mentioned previously with the other terminal being connected to the pipe or water and the electrostatic effect produced so as to kill or inhibit growth of bacteria as required.

This embodiment may be disposed generally in an elbow or angled pipe portion or enlarged pipe section as mentioned in the other embodiment.

Preferably, the voltage and the thickness and electrical conductive characteristic of the material of the insulating housing generally or with reference to the embodiment disclosed are adjusted and/or selected relative to each other so as to allow a passage of current of some milliamps in magnitude insufficient to present any danger to human life and preferably insufficient to contravene respective national safety regulations, but sufficient to kill or inhibit the growth of bacteria. For example, a housing with a thickness of 60 thousandths of an inch and a power supply of some 6,500 volts D.C. would draw current or have a current leakage of some 3 to 7 milliamps which is not considered harmful. The leakage may result from electrons being charged on the outside of the device and removed by the flow of water. A Variac or other voltage varience controller may be used.

It is a significant feature of the present invention, for the tubular housing (3 or 21) of electrically insulating material to be an integral or unitary structure so that risk of leakage of water into the device is minimized.

Various modifications and changes may be made to the embodiments disclosed without departing from the inventive concept defined herein in the appended claims.

I claim:

1. A device for electrostatically killing or treating bacteria or other microorganisms in water by subjecting the water to an electrostatic effect to kill or inhibit the growth of bacteria, comprising:

a mounting means mountable on the exterior of a means for containing flowing water; said mounting means and, in use, said water containing means, having passage means for communicating with the interior of said means for containing water with said passage means of said mounting means having a first end to be located adjacent said means for containing water and a second end to be located remote from said means containing water;

an elongate tubular housing of rigid electrically insulating material having two ends, and being permanently closed at a first end by being of integral formation or by having a closure member fixedly welded or bonded thereto, and the second end of the tubular housing being open and having integral securement means for securement in the passage means in said mounting means so that, in use, the first end of the housing extends in cantilever manner into said means for containing water, said tubular housing being insertable into and removable from said mounting means only via said second end of said mounting means normally remote from the water containing means; and an electrode removably insertable into and removable from said elongate tubular housing only via said second open end of said housing and extending from within said mounting means towards said closed, first end of the tubular housing, said electrode having terminal means for connection to a high voltage source which is also connectable to the means for containing water so as to provide an electrostatic field in the water.

2. A device as claimed in claim 1, in which said tubular housing is cylindrical and has walls made of solid polypropylene.

3. A device as claimed in claim 1, in which the electrode is a solid bar or a hollow tubular member.

4. A device as claimed in claim 1, wherein said securement means in said second end of the tubular housing includes a flange which seats on a shoulder of said mounting means.

5. A device as claimed in claim 1, wherein said securement means in said second end of the tubular housing and the mounting means include threaded portions which are adapted to interegage to secure the tubular housing in the mounting means and the two threaded portions are tapered so as to diverge in a direction away from the closed free end of the tubular housing to provide for watertight securement.

6. A device as claimed in claim 1, in which said mounting means is securable by bonding directly on said water containing means or has external screw threads engageable on screw threads on the inside of a second mounting means itself securable on the water containing means.

7. A device as claimed in claim 6, in which the first mentioned mounting means has a hexagonal or like portion to facilitate screw securement.

8. A device as claimed in claim 1, in which the device is of a size and shape so that it may be located directly into the piping of a new or existing system.

9. A device as claimed in claim 8, in which the device is of a size and shape so that it may be located in the elbow of a water pipe so as to extend along a portion of the pipe adjacent the elbow.

10. A device as claimed in claim 1, said device further comprising a high voltage electric supply which includes a ground-fault detector which will trip at above a permitted small milli-amp current flow.

11. A device as claimed in any of claim 1 wherein, in use the voltage and the thickness and electrical conductive characteristic of the material of the insulating housing are adjusted and/or selected relative to each other so as to allow a passage of current of some milliamps in magnitude insufficient to present any danger to human life but sufficient to kill or inhibit the growth of bacterial or other microorganism.

12. A device for electrostatically killing or treating bacteria or other microorganisms in water by subjecting the water to an electrostatic effect to kill or inhibit the growth of bacteria, comprising:

a tubular mounting means mountable on the exterior of a means for containing flowing water;

said mounting means and, in use, said water containing means, having passage means for communicating with the interior of said means for containing water with said passage means of said mounting means having a first end to be located adjacent said means for containing water and a second end to be located remote from said means containing water, said passage means having a reduced diameter portion adjacent said first end so as to form seating means;

an elongate tubular housing of rigid electrically insulating material having two ends, and being closed at a first end by being of integral formation or by having a closure member permanently fixedly welded or bonded thereto, and the tubular housing being open at the second end and having means for securement in said mounting means so that, in use, the housing extends in cantilever manner into said means for containing water, said insulating tubular housing being insertable into and removable from said mounting means only via said second end of said mounting means normally remote from the water containing means; and an electrode removably insertable into and removable from said elongate tubular housing only via said second open end of said housing and extending from within said mounting means towards said closed, first end of the tubular housing, said electrode having terminal means for connection to a high voltage source which is also connectable to the means for containing water so as to provide an electrostatic field in the water.

13. The device of claim 12 wherein said means for securement comprises an integral outwardly directed sealing flange for clamping in watertight securement to said seating means in the passage means in said mounting means.

14. The device of claim 12 wherein said means for securement comprises a tapered, externally threaded sealing portion tapered to increase in diameter towards said second end for screwing in watertight securement to said seating means in the passage means in said mounting means.

* * * * *